Feb. 27, 1962 R. J. HOTCHKISS, JR 3,023,028
EVENER HINGE ASSEMBLY
Filed Nov. 12, 1957 2 Sheets-Sheet 1
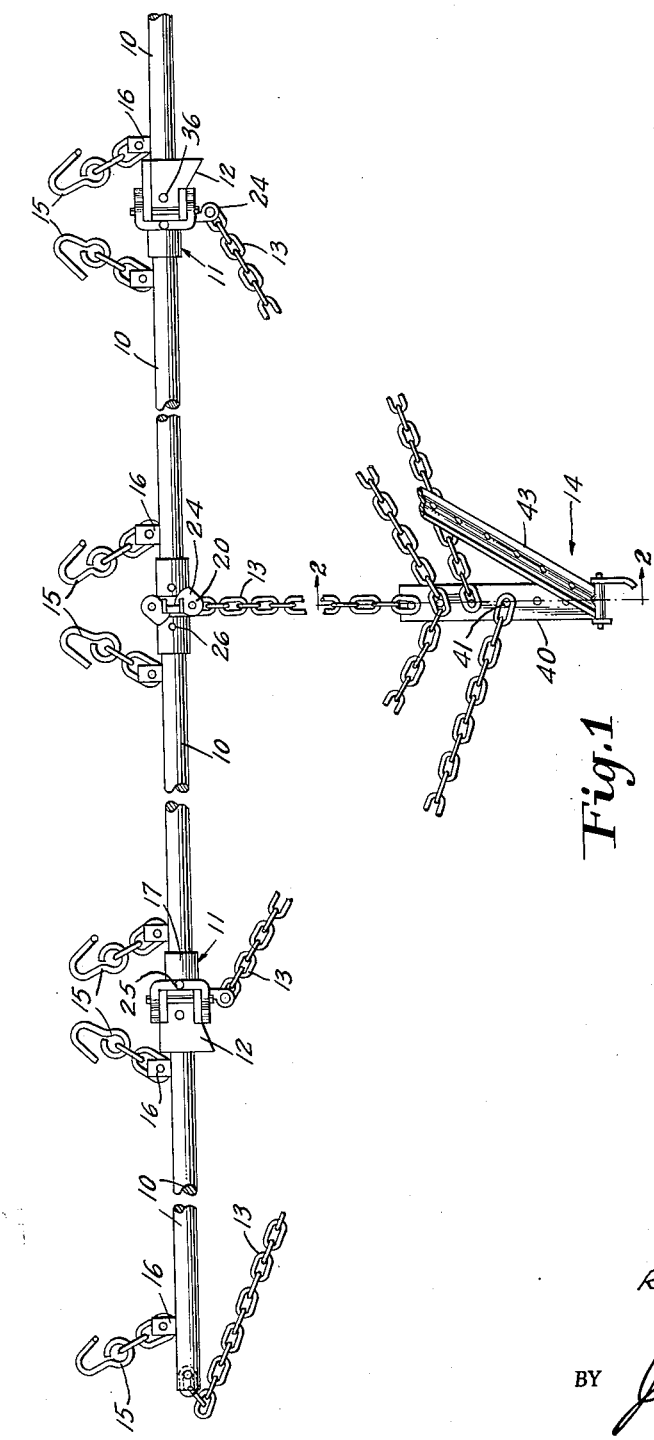
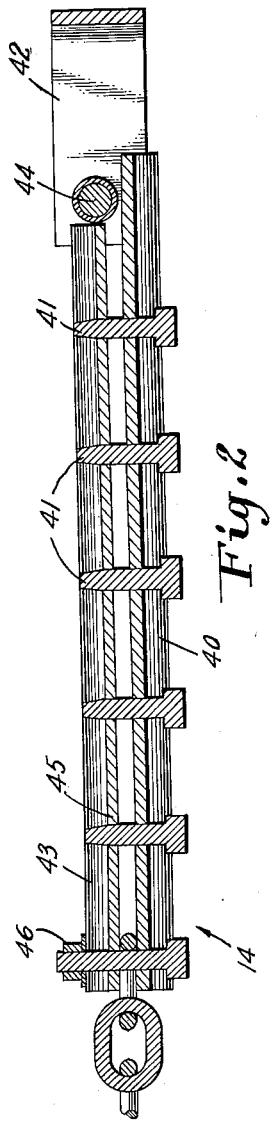
INVENTOR
Robert J. Hotchkiss, Jr.
BY Jerome W Paxton
ATTORNEY 2,023,028
Patented Feb. 27, 1962

3,023,028
EVENER HINGE ASSEMBLY
Robert J. Hotchkiss, Jr., Bradford, Ill.
Filed Nov. 12, 1957, Ser. No. 695,825
13 Claims. (Cl. 280—411)

This invention relates to the art of agricultural equipment.

More particularly, my invention is directed to harrow eveners and specifically to novel means for connecting the strut bars in the drag bar assemblage thereof, and to novel means of gathering the tow chains for a tractor hitch.

It is a paramount object of the invention to provide a simpler, more functional appearing structure capable of more versatile arrangements in modifications as to overall length and layout of the evener for functional performance.

With the invention, the strut connection assemblies being considered separate components may be shipped to distant locations for use at the destination with locally procured pipe, chain and the like and the design of the components is such that they more effectively develop the bending resistance of the struts where the bending moment is maximum, namely, vertically at the drag bar center where strut compression and tow chain updraft are simultaneously maximum and horizontally, at the extremity of the outermost strut connection assembly thereby reducing the weight of the structure by design and use of materials.

Broadly, the hinge assemblage is constituted of two leaf elements, one of the leaf elements having socket means and pin means serving to hold a strut against vertical, horizontal, and excessive longitudinal movement, the other leaf member having cavity means and securing means functioning to hold a strut thereby against vertical, excessive longitudinal, or rearward horizontal movement, yet allowing limited forward pivoting of the strut about its securing means.

A hinge assemblage may be composed of either two socket leaves, or two cavity leaves, or of a socket and a cavity leaf.

The arrangement is such that the plane of restraint at which maximum bending resistance is developed, whether vertical or horizontal, is at the leaf extremity where the conformity of contact between strut and leaf supports the strut wall and broadly disperses the bearing pressure between conforming surfaces; likewise, the opposing restraint required to develop strut bending resistance, where such is maximum is in the conformity of surface between the strut end and the leaf and the securing pin is used only to prevent excessive longitudinal movement of the strut and as a center of limited pivoting thus allowing a broad manufacturing tolerance in size and alignment of holes for the securing pin in both the strut and the leaf.

Either the leaf containing the socket means or the cavity means may be provided with a towing lug arranged perpendicular to the plane of pivoting of the hinge assemblage and disposed between the double hinge points of the assemblage and the socket containing leaf may include a slot in which a towing connection perpendicular to the customary towing lug can be arranged near the center of gravity of the hinge assemblage. The cavity assemblage further includes a shielded front zone, a passage space above and below the strut and an open rear zone to enable dirt and other foreign matter to find access to the rear thereof thereby preventing clogging of the assemblage.

A study of the following description will reveal further objects and advantages of the invention which will be readily apparent to a person skilled in the art.

In order to fully understand the invention, reference will be had to the attached drawings, forming part of the application, wherein like numerals denote the same or similar parts and in which:

FIG. 1 is a plan view of a four section evener, partly broken away, embodying the invention.

FIG. 2 is a vertical sectional view of the hitch unit taken along section line 2—2 of FIG. 1.

Figure 3:
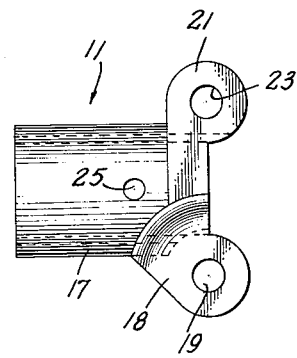
FIG. 3 is a top view of one of the hinge leaves containing the socket means.

In FIG. 1, there is shown a four section set-up including struts 10, hinge leaves 11 embodying socket means, hinge leaves 12 containing cavity means, towing chains 13, a hitch unit 14 and connector chains 15 between the evener and the harrow sections with the chains 15 being attached to lugs 16 on the struts 10.

For the purpose of simplicity, the hinge leaves 11 will be referred to as "barrel" hinges and the leaves 12 as "bell" hinges. Also, in the illustrated form, it will be noted that I employ two bell leaves and four barrel leaves, and this is the most efficacious arrangement.

Figure 4:
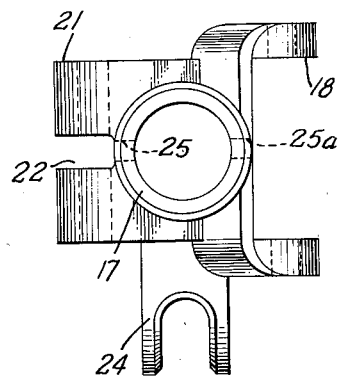
FIG. 4 is an end view of the leaf shown in FIG. 3.

Each leaf 11 is a cast unit and consists of a cylindrical body 17 having a through bore of uniform diameter which substantially coincides with the outer diameter of the strut and positioned thereon. One end of the body 17 embodies an abutment plane perpendicular to the bore and a pair of angularly offset ears 18 centered on the abutment plane spaced apart in the vertical direction with each ear having an opening 19 therein for reception of a hinge pin or the like 20. Diametrically opposite the ears 18, and centered on the abutment plane, the body 17 carries a pair of horizontally extending lugs 21 separated by a slot 22 and the outer face of each of the lugs 21 coincides with the inner face of each of the ears 18 as in FIG. 4. Each of the lugs is formed with an opening 23 on the same center as the opening 19 of the ears 18. Hence, when two barrel leaves are arranged in end to end relationship, as in FIG. 1, the lugs 21 of one body will be positioned between the ears of the other body while the lugs of the last named body will be between the ears of the first named body with the respective openings 19 and 23 in registry. Upon the positioning of hinge pins 20 in the aligned openings, the two barrel leaves will be interconnected and by virtue of the slot 22, one of the towing chains can be connected to the hinge by locating one of the links in the slot prior to the insertion of the hinge pin 20. Further, the ears and lugs are offset with respect to the longitudinal axis to allow substantially 180 degree folding of one leaf on the other yet to prevent unfolding beyond the substantially common longitudinal strut axis of the two assembled leaves.

The body 17 is further provided with an apertured towing lug 24 which is perpendicular to the slot 22, and where symmetry prompts locating the aperture in the abutment plane, it is necessary to omit one of these lugs when two barrel leaves are connected together as in FIG. 1, or more specifically, the lug 24 is removed from one of the leaves in the embodiment shown.

It will also be seen that the body 17 is provided with aligned apertures 25 and 25a, the latter being the bore of body 17 and in the same plane but perpendicular to aligned apertures 25, in the proximity of the end adjacent the ears and lugs to receive a pin 26 by means of which the strut is secured within the body.

Since some longitudinal movement of the strut end is permissible in the bore of the body, a broad manufacturing tolerance exists in the size and alignment of apertures 25 and 25a. The substantial conformity of the bore of the body 17 with the outer surface of the strut end both supports the strut walls, if a hollow strut, and broadly disperses the bearing pressure of the contact surfaces to develop the maximum bending resistance of the strut, whether the tow be through the slot 22 or perpendicular thereto, by means of the towing lug 24 and such strut bending moment is maximum vertically at the extremities of the centermost leaf hinge assemblage where strut compression and updraft are in the proximity of the simultaneous maximum of the center point of the evener drag bar.

Thus, in a drag bar assembly constituting secured struts in an arrangement of barrel leaves 11 throughout, the said leaves may be double pinned as a rigid unit, or the outer hinge pairs may be pinned from the top and towed by means of the lug to allow 180 degree folding while preventing the struts from dipping excessively below the longitudinal axis of the drag bar assembly. In addition, the centermost hinge pair may be either top pinned or the leaves may be turned 90 degrees on the strut so that the tow may be through one of the hinge pins and the removal of the rearward pin will allow forward pivoting of the drag bar assembly about the remaining pin while preventing any excessive movement of the struts rearward of the longitudinal axis of the draw bar assembly.

Figure 5:
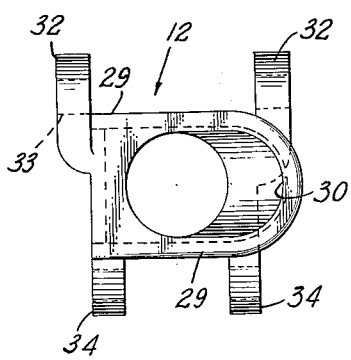
FIG. 5 is an end view of the leaf hinge embodying the cavity means.
Figure 6:
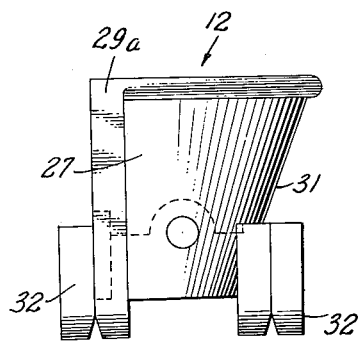
FIG. 6 is a top view of the leaf shown in FIG. 5.

The hinge leaf 12 comprises a cast body 27 having a planar side 28, an abutment end 29, a flat oval orifice end 29a and an arcuate side 30. The arcuate side tapers as shown at 31, and at the abutment end 29, a pair of wings 32 extend outwardly from the body and each wing is formed with a hole 33 therein. The opposite zone of the body 27 is formed with outwardly extending apertured lugs 34 (FIG. 5) with the outer face of each lug being in the same plane as the inner face of each wing. The abutment surface and the position of the wings and apertured lugs are such that when a bell hinge 12 and a barrel hinge 11 are arranged in end to end relationship, as in FIG. 1, the apertured lugs 34 of the bell leaf will be positioned between the ears 18 of the barrel leaf and the lugs 21 of the barrel leaf will be disposed between the wings 32 of the bell leaf with the respective openings, holes and apertures in registry and the abutment surfaces in contact. When hinge pins 20 are positioned in the aligned openings, holes and apertures, the bell leaf and the barrel leaf will be interconnected and can be double pinned to define a fixed connection or may be single top pinned to allow substantially 180 degree vertical folding of one leaf on the other while preventing unfolding beyond the substantially common longitudinal axis of the two assembled leaves.

The planar side of the bell leaf is provided with a slot 35 therein while the arcuate side is solid or non-foraminous so that as the arcuate side faces the line of draft, it is difficult for dirt to enter the hinge unit, but, if such should occur, the dirt finds ready access through the slot 35. The strut is connected to the bell leaf by a pin 36 passing through aligned holes 37 in the body in proximity to the abutment end of the body. It will be seen that the pin 36 prevents excessive longitudinal movement of the strut in the cavity and that the formation of the cavity prevents vertical movement and any rearward horizontal pivoting of the strut secured therein rearward of the longitudinal axis of the hinge assembly but permits a limited horizontal pivoting of the strut forward of the longitudinal axis. The limit of horizontal pivoting in either direction is determined by the approximately 180 degree of opposite arcuate bearing surface in the proximity of the leaf ends, on both sides of the securing means, which arcuate bearing surface supports the wall of the strut, if a hollow strut, and broadly disperses the bearing pressure between leaf and strut to develop specifically, the maximum horizontal bending resistance of the strut. Furthermore, the arcuate sides of the flat oval orifice end of the leaf reduce the length of flat span of the top and bottom of such orifice to augment the bending resistance of the top and bottom surfaces of the bell leaf against vertical strut pressure when such bell leaf is used intermediate any exterior leaf in a drag bar assembly. Manifestly, since the maximum horizontal strut binding resistance is developed by the arcuate bearing surfaces straddling the securing means for the strut, there may be a broad manufacturing tolerance in size and alignment of the holes for the securing means in both the bell leaf and the strut.

Forming the respective hinge leaves as castings is advantageous since the same can be made in lighter-weight metals as well as iron or steel.

To permit the towing chains to be readily connected to the particular set-up employed, the hitch 14 is of special character. It includes a base plate 40 to which is welded a plurality of spaced apart studs 41. Welded or otherwise secured to one end of the plate 40 is a towing clevis 42, and, an upper plate 43 is pivotally connected between the clevis legs on pin 44. The plate 43 is formed with a series of holes 45 which correspond to the locations of the studs 41 so that when the plate 43 is swung downwardly, the upper ends of the studs project through the holes. To secure the plate 43 in position, the outermost stud 41 can be of greater length than the other studs and provided with screw threads to permit a nut 46 to be threaded thereon.

While the operation of the hitch is deemed obvious, briefly it is summarized as follows:

After the desired chains have been attached to the evener sections, the other ends or an intermediate link of the chains is positioned about the proper studs, after which the upper plate 43 is swung downwardly to the position depicted in FIG. 2. The nut 46 is then drawn up on the outer stud to lock the hitch in the closed position. To change the chain relationship, it is merely necessary to remove the nut 46, pivot the plate 43 upwardly and the user may then adapt the hitch to the set-up in question.

Referring again to FIG. 1, the evener employs two pairs of combined top connected barrel and bell leaves for the outer strut sections and one pair of barrel leaves for the inner ends of the inner struts. The center towing chain is secured in the slot 22 by the pin 20, the intermediate chains to the lugs 24 and the outer chains to the ends of the outer struts 10. By virtue of the fact that the arcuate sides of each of the bell leaves face the direction of draft, the outer struts may have a limited forward pivotal movement horizontally thereby enabling the farmer to make short turns without the likelihood of standing the harrow on end. In addition, the outer sections or struts can be swung upwardly 180 degrees about their pivots to position such sections above the middle sections to enable the harrow to move through restricted openings and by swinging the evener forwardly about the pin 20 of the middle hinge unit, after removing the rear pin 20, the unit can pass through a very narrow gate or the like. In addition, in this position, the evener is quite compact and can be stored or transported in a minimum of space.

It will additionally be appreciated that by reason of the ears on the barrel leaf, the pin can be positioned on either side of the unit and the use of a pin in each of the ear and lug combinations, an extremely rigid assembly is afforded.

As mentioned above, the barrel and bell leaves enable an evener of varying sections to be produced. While such other sectional set-ups are not shown herein, it is possible to provide a two section evener by using a pair of barrel leaves arranged so that in addition to towing through a hinge pin as illustrated in the center hinge assembly of FIG. 1, the pair of barrel leaves may also be towed by the towing lug and arranged for top pivoting, or, with a rigid connection between the leaves. It is likewise feasible to use a pair of bell leaves with a towing lug cast on one of the leaves or with a tow pin longitudinally attached to the chain and such tow pin used in lieu of one of the knuckle pins in a draft against the arcuate sides of the two assembled bell leaves.

In connection with a three section unit, I employ two hinge assemblies, (a) with each comprising one barrel leaf and one bell leaf so that the outer sections can have a limited forward pivoting as explained above and in addition permit the stack folding of one outer section on the center section and the remaining outer section on top of the first outer section; (b) the same advantage of stack folding is present in a set-up composed of top connected barrel leaves throughout and while this arrangement will not permit limited forward safety pivoting, the tow of the barrel leaves can also be through the forward hinge pin to allow limited forward pivoting by providing a limit chain attached to the rear of adjacent section runners; while it is not possible to stack fold the sections in a forward pivot pin tow connection, for moving the assembly through a very narrow gate, the sections can be detached from the evener and stacked for storage or transportation and the evener per se stack folded without the removal of the towing chains due to the offset of the ears 18 and lugs 21 being such as to permit the substantially 180 degree pivoting of two barrel leaves about a pin 20 with a chain positioned in the slot 22.

As to a four section unit, I use three hinges with two combined barrel and bell assemblies and a center barrel leaf assembly (FIG. 1) disposed for either top or side pivoting or rigidly connected. Here again, the outermost assemblages of a barrel-bell leaf combination may be replaced by two barrel leaves to allow either (a) 180 degree vertical folding, if towed through the towing lug or (b) limited forward safety pivoting, if towed through the slot of the forward pivot pin with a limit chain attached to the rear of adjacent section runner channels.

If it is desired to pivot the four section evener of FIG. 1 in the direction of the hitch to reduce the overall length of the same to allow the assemblage to pass through a narrow gate, first, the user vertically folds the two outermost struct onto the two innermost struts, second, removes the hinge pin 20 facing the line of draft thus disengaging the chain, third, the pin is replaced and the pin 20 rearward of the line of draft is removed thus allowing the evener center to fall behind while the new ends come forward to swing about the remaining pin 20. If the towing chain is disengaged at the hitch 14 instead of at the pin 20, the slot 22 will prevent fouling of the chain 13.

For five sectional set-ups, all hinge units may include barrel-bell leaf combinations inasmuch as short turning can be best and safely achieved by allowing limited hinge opening between the three innermost sections on the turn.

In the six sectional set-up, four pairs of the barrel-bell combination with a pair of barrel leaves at the center being used is an efficacious structure.

It will be seen that a set-up of any number of sections may be arranged using barrel leaves throughout and capable of being (1) rigid throughout, (2) top pivoted throughout, (3) towed through a hinge pin in the centermost barrel hinge assembly, and (4) towed through a hinge pin in any barrel hinge assembly on either side of center thereby providing a limit against excessive forward pivoting ahead of the longitudinal axis of the draw bar by the use of a short length of chain between and connected to the rear of adjacent section runner channels.

A person skilled in the art will readily and easily ascertain how the hinge assemblies can be utilized to accomplish the best results with the particular harrow set-up to be employed.

It is to be understood that the invention is not to be confined to any strict conformity with the showings in the drawings but changes or modifications may be made therein provided such changes or modifications mark no material departure from the invention as set forth in the appended claims.

I claim:
1. A harrow evener draw bar assembly comprising at least two strut members, hinge means interconnecting adjacent strut members, the hinge means including two leaf members, each of said leaf members being provided with a socket for receiving the end of one strut member, pin means securing the strut member in its socket against excessive longitudinal movement, one of said members having perpendicular aperture means allowing the leaf member to be turned 90 degrees on the strut member axis, and complemental means on the leaf members interconnecting the members at their adjacent ends.

2. An assembly as claimed in claim 1 wherein said perpendicular aperture means is provided in said leaf member.

3. An assembly as claimed in claim 1 wherein said complemental means includes spaced apertured lugs on one leaf member and spaced apertured wings on the other leaf member with the lugs positioned between the wings with the apertures in registry and pin means lodged in the apertures of at least one lug and one wing in registry.

4. An assembly as claimed in claim 1 wherein said complemental means includes at least one apertured component on one leaf member, at least one apertured component on the other leaf member with such components positioned with the apertures in registry and pin means lodged in the apertures to interconnect the leaf members.

5. An assembly as claimed in claim 1 wherein said complemental means prevents the unfolding of one leaf member respecting the other leaf member beyond the common longitudinal axis of the strut members.

6. An assembly as claim 1 wherein the inner contour of the socket substantially coincides with the outer contour of the strut member at least in the area of the strut member extremity and the leaf member extremity remote from the complemental means.

7. An assembly as claimed in claim 1 wherein the pin means is located between the end of the strut member and the leaf member and opposite the complemental means.

8. An assembly of the type set forth, comprising at least two struts, hinge means interconnecting the struts, the hinge means including two leaf members one of said members having a socket therein for receiving the end of one strut, pin means securing the strut in the socket against excessive longitudinal movement, the other leaf member having therein a cavity, pin means securing the other strut in the cavity against excessive longitudinal movement, complemental means on the leaf members interconnecting the members at their adjacent ends, said cavity having a shape such as to restrain the secured strut from vertical or rearward movement behind the common strut axis yet allow forward swinging of the strut about its pin means to the extent determined by the shape of the cavity.

9. An assembly as claimed in claim 8 wherein said complemental means includes at least one apertured component on one leaf member, at least one apertured component on the other leaf member with such components positioned with the apertures in registry and pin means lodged in the apertures to interconnect the leaf members.

10. An assembly as claimed in claim 8 wherein the complemental means allows swinging movement of at least one leaf member and its strut to a position on the other leaf member.

11. An assembly as claimed in claim 1 wherein at least one of said leaf members is provided with slot means therein opposite the direction of travel of the assembly to allow any foreign matter entering the hinge means to find exit from the hinge means.

12. An assembly as claimed in claim 8 wherein said complemental means includes spaced apertured lugs on one leaf member and spaced apertured wings on the other leaf member with the lugs positioned between the wings with the apertures in registry and pin means lodged in the apertures of at least one lug and one wing in registry.

13. An assembly as claimed in claim 8 wherein at least one of said leaf members is formed with slot means therein opposite the direction of travel of the assembly to permit any foreign matter entering the hinge means to find exit from the hinge means.

References Cited in the file of this patent

UNITED STATES PATENTS

| | | |
|---|---|---|
| 724,505 | Riemenschneider | Apr. 7, 1903 |
| 2,284,408 | Endres | May 26, 1942 |
| 2,735,251 | Dlugosch | Feb. 21, 1956 |
| 2,838,899 | Kovar | June 17, 1958 |